3,462,408
MONOAZO DYESTUFFS CONTAINING A 6-HY-DROXYNAPHTHOSTYRILE GROUP
Albrecht Hoffmann, Cologne-Stammheim, and Gerhard Wolfrum, Opladen, Germany, assignors to Farbenfabriken Bayer Aktiengesellschaft, Leverkusen, Germany, a corporation of Germany
No Drawing. Filed Jan. 17, 1966, Ser. No. 520,843
Claims priority, application Germany, Feb. 5, 1965,
F 45,155
Int. Cl. C09b 45/16, 45/20, 29/36
U.S. Cl. 260—146          15 Claims

ABSTRACT OF THE DISCLOSURE

Metal complex dyestuffs, useful for dyeing fibres such as wool and polyamides, are prepared by complexing 2 moles of monoazo dyestuffs having complex-forming groups o and o' to the azo bridge, with 1 mole of a metal such as chromium, cobalt, copper, iron or nickel. At least one of the monoazo dyestuffs is derived from a naphthostyrile coupling component. The second of the dyestuffs may be the same as the first, derived from another napthhostyrile or a monoazo dyestuff derived from conventional coupling agents.

---

It has been found that valuable new dyestuffs of the general formula

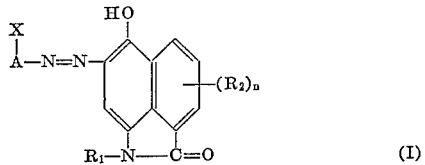

(I)

wherein A denotes the radical of a diazo component, in which X is in the o-position to the azo group, X is a group forming metal complexes or a substituent which is convertible into such a group under the conditions of metallisation, $R_1$ denotes hydrogen or a lower alkyl group which may be further substituted, $R_2$ represents hydrogen or a substituent, and $n$ stands for the number 1 or 2,
or their metal compounds, are obtained, when a diazo compound containing in the o-position to the diazo group a group capable of forming metal complexes or a substituent convertible into such a group under the conditions of metallisation, is coupled with a coupling component of the structure

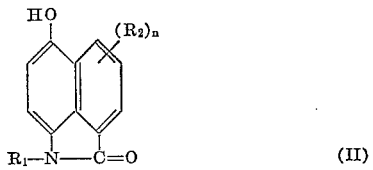

(II)

in which $R_1$, $R_2$ and $n$ have the stated meaning, and the resultant azo dyestuffs are optionally treatd in substance or on the fibre with metal-yielding agents, optionally in the presence of other azo or azomethine dyestuffs forming metal complexes.

Coupling of the starting components to produce the azo dyestuffs (I) is carried out by known methods in the acidic, neutral or alkaline range in an aqueous, aqueous-organic or organic medium.

The following carbo- and hetero-aromatic amines can be used as diazo components, for example:

2-aminophenol,
4-chloro-2-aminophenol,
4,6-dichloro-2-aminophenol,
3,4,6-trichloro-2-aminophenol,
4-nitro-2-aminophenol,
5-nitro-2-aminophenol,
4,6-dinitro-2-aminophenol,
4-chloro-5-nitro-2-aminophenol,
4-chloro-6-nitro-2-aminophenol,
6-chloro-4-nitro-2-aminophenol,
6-nitro-2-amino-4-acetylaminophenol,
3-amino-4-hydroxy-toluene,
5-nitro-3-amino-4-hydroxy-toluene,
2-aminophenol-4-sulphonic acid,
2-aminophenol-4-sulphonic acid amide,
2-aminophenol-4-sulphonic acid methylamide,
2-aminophenol-4-sulphonic acid-dimethyl amide,
2-aminophenol-4-sulphonic acid-β-hydroxy-ethylamide,
2-aminophenol-4-sulphonic acid-morpholide,
6-chloro-2-aminophenol-4-sulphonic acid,
5-nitro-2-aminophenol-4-sulphonic acid,
6-nitro-2-aminophenol-4-sulphonic acid,
2-aminophenol-5-sulphonic acid,
2-aminophenol-5-sulphonic acid amide,
2-aminophenol-5-sulphonic acid dimethylamide,
2-aminophenol-5-sulphonic acid morpholide,
4-chloro-2-aminophenol-5-sulphonic acid,
4-chloro-2-aminophenol-6-sulphonic acid,
4-nitro-2-aminophenol-6-sulphonic acid,
2-amino-4-acetaminophenol-6-sulphonic acid,
2-aminophenol-4-6-disulphonic acid,
3-amino-2-hydroxy-benzoic acid,
5-nitro-3-amino-2-hydroxy-benzoic acid,
3-amino-4-hydroxy-benzoic acid,
3-amino-2-hydroxy-5-methyl-benzoic acid,
3-amino-2-hydroxy-1-benzoic acid-5-sulphonic acid,
(3-amino4-hydroxy-phenyl)-ethyl-sulphone,
3-amino-4-hydroxydiphenylsulphone,
3-amino-4-hydroxy-benzene-methylenesulphone-(2)-ether-(1),
1-amino-2-napthol,
2-amino-3-naphthol,
1-amino-naphthol-(2)-sulphonic acid-(6),
2-amino-naphthol-(1)-sulphonic acid-(4),
2-amino-naphthol-(3)-sulphonic acid-(6),
2-amino-3-naphthol-disulphonic acid-(6,8),
2-amino-benzoic acid,
4-chloro-2-amino-benzoic acid,
5-chloro-2-amino-benzoic acid,
6-chloro-2-amino-benzoic acid,
4-nitro-2-amino-benzoic acid,
5-nitro-2-amino-benzoic acid,
4-acetylamino-2-amino-benzoic acid,
5-acetylamino-2-amino-benzoic acid,
3-5-dichloro-amino-benzoic acid,
2-aminobenzoic acid-(1)-sulphonic acid-(4),
2-amino-benzoic acid-(1)-sulphonic acid-(5),
2-amino-benzoic acid-(1)-sulphonic acid-(4)-amide,
2-amino-naphthalene-3-carboxylic acid,
2-amino-naphthalene-3-carboxylic acid-6-sulphonic acid,
1-amino-anthraquinone-2-carboxylic acid, 8-amino-quinoline,
2-amino-pyridine,
2-amino-benzthiazole,
6-methoxy-2-aminobenzthiazole,
6-ethoxy-2-amino-benzthiazole,
3-phenyl-5-amino-thiadiazole-(1,2,4),
3-amino-1,2,4-triazole,
3-amino-1,2,4-triazole-5-carboxylic acid.

Suitable diazo components with an o-positioned alkoxy group are, for example:

2-amino-anisole,
4-chloro-2-amino-anisole,
5-chloro-2-amino-anisole,
4,5-dichloro-2-amino-anisole,
4-nitro-2-amino-anisole,
5-nitro-2-amino-anisole,
4-chloro-5-nitro-2-amino-anisole,
2-amino-4-acetamino-anisole,
3-amino-4-methoxy-toluene,
3-amino-4-methoxy-6-benzoyl-amino-toluene,
6-chloro-3-amino-4-methoxy-toluene,
4-amino-1,3-dimethoxybenzene,
6-chloro-4-amino-1,3-dimethoxybenzene,
2-amino-1,4-dimethoxybenzene,
5-amino-2-acetamino-1,4-dimethoxybenzene,
5-amino-2-benzoylamino-1,4-dimethoxybenzene,
2-aminoanisole-4-sulphonic acid methylamide,
2-amino-anisole-4-sulphonic acid-diethylamide,
2-amino-anisole-4-sulphonic acid-n-butylamide,
2-amino-anisole-4-sulphonic acid-di-n-butylamide,
2-aminoanisole-4-sulphonic acid-morpholide,
5-nitro-2-amino-anisole-4-sulphonic acid,
2-amino-1,4-dimethoxybenzene-5-sulphonic acid amide,
3-amino-4-methoxybenzoic acid,
4-amino-3-methoxy-diphenyl-amine,
(3-amino-4-methoxy-phenyl)-ethyl-sulphone,
3-amino-4-methoxy-diphenylsulphone,
(3-amino-4-methoxy-phenyl)-benzylsulphone,
2-amino-3-methoxy-diphenylene-oxide.

Suitable diazo components are also amines carrying in the o-position to the amino group a halogen atom, a sulpho group or a hydrogen atom which are converted by the metallisation into metal complex-linked hydroxyl groups, such as 2-chloroaniline,
2,3-dichloroaniline,
2,4-dichloroaniline,
2,5-dichloroaniline,
2-chloro-4-nitroaniline,
2,5-dichloro-4-nitroaniline,
4-chloro-3-amino-toluene,
4,6-dichloro-3-amino-toluene,
4-chloro-3-aminobenzene-1-sulphonic acid,
3-chloro-4-amino-benzene-1-sulphonic acid,
2,5-dichloro-4-aminobenzene-1-sulphonic acid,
4-chloro-6-nitro-3-amino-anisole,
4-chloro-3-amino-benzoic acid,
1-chloro-2-amino-anthraquinone;
2-amino-benzene-1-sulphonic acid,
4-chloroaniline-2-sulphonic acid,
5-chloroaniline-2-sulphonic acid,
4,5-dichloroaniline-2-sulphonic acid,
4-nitro-aniline-2-sulphonic acid,
4-amino-toluene-3-sulphonic acid,
2-aminobenzene-disulphonic acid-(1,4),
4-aminobenzene-disulphonic acid-(1,3),
4-(N-acetylamino)-2-aminobenzene-sulphonic acid-(1),
5-(N-acetylamino)-2-aminobenzene-sulphonic acid-(1),
4-amino-anisole-sulphonic acid-(3),
naphthylamine-(1)-sulphonic acid-(2),
naphthylamine-(2)-sulphonic acid-(1),
naphthylamine-(2)-disulphonic acid-(3,6),
naphthylamine-(2)-disulphonic acid-(3,7);
3-chloroaniline,
4-chloroaniline,
3,4-dichloroaniline,
3,5-dichloroaniline,
3-nitroaniline,
4-nitroaniline,
3-aminotoluene,
6-chloro-3-amino-toluene,
4-aminotoluene,
1-aminobenzene-3-sulphonic acid,
1-aminobenzene-4-sulphonic acid,
1-naphthylamine,
2-naphthylamine,
1-naphthylamine-4-sulphonic acid,
2-naphthylamine-6-sulphonic acid and the like.

The 6-hydroxy-naphthostyriles used as coupling components can be prepared by methods known in principle and described, for example, in German patent specifications Nos. 645,241 and 679,977, in that naphthostyriles are nitrated, the nitro compound is reduced to the amino compound and the amino compound converted into the hydroxy compound by heating with sulphuric acid under pressure, or in that derivatives of 5-hydroxynaphthalene-1-carboxylic acid are coupled in the 8-position with a suitable diazonium compound, the dyestuffs reductively split and the resultant 5-hydroxy-8-amino-naphthalene-1-carboxylic acid is cyclised to produce the corresponding 6-hydroxy-naphthostyrile.

Suitable coupling components are, for example:

6-hydroxy-naphthostyrile,
3-methyl-6-hydroxy-naphthostyrile,
5-methyl-6-hydroxy-naphthostyrile,
5-ethyl-6-hydroxy-naphthostyrile,
3-chloro-6-hydroxy-naphthostyrile,
5-chloro-6-hydroxy-naphthostyrile,
3,5-dichloro-6-hydroxy-naphthostyrile,
3-methoxy-6-hydroxy-naphthostyrile,
5-methoxy-6-hydroxynaphthostyrile,
3-ethoxy-6-hydroxy-naphthostyrile,
4-nitro-6-hydroxy-naphthostyrile,
3-acetylamino-6-hydroxy-naphthostyrile,
5-acetylamino-6-hydroxy-naphthostyrile,
6-hydroxy-naphthostyrile-5-sulphonic acid,
6-hydroxy-naphthostyrile-5-sulphonic acid amide,
6-hydroxy-naphthostyrile-5-sulphonic acid methylamide,
6-hydroxy-naphthostyrile-5-sulphonic acid dimethylamide,
6-hydroxy-naphthostyrile-5-methylsulphone as well as the 1-N-methyl, 1-N-ethyl, 1-N-butyl, 1-N-hydroxy, 1 - N - chloroethyl, 1-N-acetoxyethyl, 1-N-$\beta$-cyanoethyl and 1-N-$\beta$-carbethoxyethyl derivatives of the stated compounds.

The naphthalene nucleus of the naphthostyrile coupling component, by definition, may contain one or two substituents. Examples are halogen substituents, especially chlorine, bromine or fluorine; alkyl, especially straight chain or branched lower alkyl groups, such as those with 1 to 5 carbon atoms; alkoxy, especially lower alkoxy radicals with 1 to 5 carbon atoms in the alkyl radical; acylamino groups, especially those which are derived from aliphatic or aromatic carboxylic acids or sulphonic acids, such as acetylamino, chloroacetylamino, cyanoacetylamino, hydroxacetylamino, alkoxyacetylamino, propionylamino, butyrylamino groups and the corresponding substitution products, benzoylamino radicals including those further substituted in the benzene ring of the benzoylamino group, benzene-sulphonylamino groups including those further substituted in the benzene ring, methyl-sulphonylamino, ethyl - sulphonylamino, propionyl - sulphonylamino groups, halotriazinylamino radicals such as monochloro-monoamino groups and substituted aminotriazinylamino and dichloro-triazinylamino groups, halopyrimidinylamino groups, such as tri- and dichloropyrimidinylamino groups, 2,3-dihaloquinoxaline-6-carbonyl- or -sulphonylamino groups, 1,4-dihalophthalazine-6-carbonyl- or -sulphonylamino groups, 2-halo- or 2-methyl-sulphonyl-benzthiazole-5-carbonyl- or -sulphonylamino groups, β-haloacetylamino, β-halopropionylamino, haloacryloylamino and acryloylamino groups, halogen in the above substituents preferably standing for Cl, but also for Br, nitro, sulphonic acid, carboxylic acid, sulphonamide, substituted sulphonamide groups, whereby the substituents can be alkyl, aralkyl, aryl radicals and substitution products of these radicals, alkyl- and aryl-sulphone groups, cyano, trifluoromethyl and disulphimide groups.

The aforesaid substituents are also especially suitable substituents for the radical A of the diazo component, which is preferably a radical of the benzene, naphthalene or heterocyclic series. Among the alkyl-sulphonyl and aryl-sulphonyl groups, the methyl-sulphonyl, ethyl-sulphonyl and phenyl-sulphonyl groups are of special interest, while among the sulphonamide groups the following substitution products may be mentioned as especially suitable, besides the unsubstituted sulphonamide group:

the monomethyl-sulphonamide,
monoethyl-sulphonamide,
monohydroxyl-sulphonamide,
monochloroethyl-sulphonamide,
N-methyl-N-ethylsulphonamide,
N,N-dimethyl-sulphonamide,
N,N-diethyl-sulphonamide,
N,N-dihydroxyl-sulphonamide,
N,N-dipropyl-sulphonamide,
sulphomorpholide,
sulphopiperidide,
N-phenyl-sulphonamide and the sulphonamide groups further substituted in the phenyl nucleus of the phenyl-sulphonamide group, e.g. by chloro, methyl, carboxy, nitro groups, or other sulphonamide groups which are further substituted. The radical of the diazo component can moreover contain further azo groups.

The optionally further substituted lower alkyl group $R_1$ can be, for example, a methyl, ethyl, propyl, isopropyl, butyl, isobutyl, β-hydroxyethyl, β-choroethyl, β-cyanoethyl β-acetoxyethyl, β-carbethoxyethyl, β-carboxethyl group or an ethyl, propyl or butyl group substituted in a different way. Those lower alkyl groups are preferred, which contain a total number of 1 to 6 carbon atoms.

The conversion of the azo dyestuffs into their metal complex compounds is preferably carried out with compounds of chromium and cobalt. The metallisation is preferably performed in an aqueous solution or in an organic medium, e.g. in formamide, ethylene glycol, glycol monomethyl ether, in a urea melt or in a concentrated aqueous solution of an alkali metal salt of a low molecular aliphatic monocarboxylic acid; it is advantageous to use at least the amount of metal-yielding agent containing 1 metal atom per 2 monoazo dyestuff molecules.

Suitable chromium compounds are chromic fluoride, chromic chloride, chromic sulphate, chromic formate, chromic acetate, chromic potassium sulphate, chromic ammonium sulphate. Compounds of hexavalent chromium, such as sodium or potassium chromate or dichromate, are also suitable, if the process is carried out in a strongly alkaline medium in the presence of reducing agents, such as glucose.

Suitable cobalt compounds are cobaltous formate, cobaltous acetate or cobaltous sulphate, which may previously be converted into complexes of trivalent cobalt, for example by oxidation with hydrogen peroxide in an ammoniacal solution. If the metallisation is carried out in a concentrated aqueous solution of an alkali metal salt of a low-molecular aliphatic carboxylic acid, water-insoluble metal compounds such as cobalt hydroxide or cobalt carbonate, can also be used. The metallisation is carried out with particular advantage in an aqueous-alkaline medium, the metal compounds being added in the presence of compounds which keep the metal dissolved in a complex linkage in a strongly alkaline medium, such as tartaric acid, citric acid or lactic acid. Other suitable metallising agents are e.g. copper salts, such as copper sulphate, iron salts, such as iron sulphate, or nickel salts, such as nickel sulphate.

If for the preparation of the dyestuffs according to the invention those diazo components are used, which carry a methoxy group in the o-position to the amino groups, then the monazo dyestuffs so obtained can also be converted into the metal complexes. The demethylating metallisation is preferably carried out in an aqueous or organic medium, for example, in ethylene glycol, glycol monomethyl ether or formamide, in the presence of basic compounds, such as e.g. ammonia, organic amines or alkalies. In this case, chromium compounds, such as chromic fluoride, chromic chloride, chromic sulphate etc., and copper compounds, such as copper chloride, copper sulphate and copper acetate, serve as metal-yielding agents. It is advantageous to add to the metallising mixture compounds which keep the metal dissolved in complex linkage in an alkaline medium, such as ammonia, glycerol, tartaric acid and pyridine.

Monoazo dyestuffs which are prepared by means of diazo components carrying a sulpho group in the o-position to the amino group, can also be converted into the metal complexes of the corresponding o,o'-dihydroxy-azo dyestuffs, by treatment with metal-yielding, preferably copper-yielding, agents in an alkaline medium.

Those dyestuffs of the general Formula 1 in which X stands for a hydrogen atom, can be converted into the metal complexes of the corresponding o,o'-dihydroxy-azo dyestuffs by treatment with metal-yielding, preferably copper-yielding, agents in the presence of oxidising substances, such as oxygen, hydrogen peroxide and per-compounds.

The metal-free o,o'-dihydroxy-azo dyestuffs of the general Formula 1 can be prepared from their copper complexes by treatment with mineral acids and, if desired, transformed into other metal complexes, preferably chromium or cobalt complexes, according to the stated processes.

To prepare pure asymmetrical 2:1 chromium complex dyestuffs it is advantageous to react the 1:1 chromium complex compound of a dyestuff of the Formula 1, in which X is OH or COOH with another metal-free dyestuff of the Formula 1 or with any other azo dyestuff forming metal complexes according to known methods to form the asymmetrical 2:1 chromium complex compound, or to react a metal-free dyestuff of the Formula 1 in which X denotes OH or COOH with the 1:1 chromium complex compound of any other azo dyestuff to form the 2:1 chromium complex compound.

In the range of the new dyestuffs (1) the metal complex compounds, and among these especially the chromium, cobalt and copper complexes, are particularly valuable in respect to their dyeing properties.

The isolation of water-insoluble metal complex dyestuffs of the type according to the invention is carried out by filtration after pouring the metallising solution into water. Water-soluble dyestuffs are previously separated from the solution by the addition of salts, such as sodium chloride, Glauber's salt or ammonium sulphate.

The new metal-free dyestuffs (1) are suitable for the dyeing of various fibre materials, for example, for the dyeing and printing of metal-modified polypropylene fibres. In the form of their 2:1 chromium or cobalt complex compounds the new dyestuffs are eminently suitable for the dyeing of natural and synthetic polypeptide fibres, such as wool, silk, synthetic superpolyamides and polyurethanes. The water-soluble metal complex compounds are chiefly suitable for dyeing wool. Satisfactory results are also obtained when wool is dyed with the new water-soluble metal-free monazo dyestuffs and the dyeings are analogous manner, which yield dyeings in the stated shades when after-chromed on wool.

TABLE 1

| Example Number | Diazo component | Coupling component | Shade after-chromed on wool |
|---|---|---|---|
| 2 | 2-aminophenol-4-sulphonic acid amide | 6-hydroxy-naphthostyrile | Olive. |
| 3 | 6-chloro-2-aminophenol-4-sulphonic acid | do | Yellowish-olive. |
| 4 | 5-nitro-2-aminophenol-4-sulphonic acid | do | Olive. |
| 5 | 6-nitro-2-aminophenol-4-sulphonic acid | do | Olive-green. |
| 6 | 2-aminophenol-5-sulphonic acid | do | Yellowish brown. |
| 7 | 2-aminophenol-5-sulphonic acid amide | do | Do. |
| 8 | 4-chloro-2-aminophenol-5-sulphonic acid | do | Brown. |
| 9 | 4-chloro-2-aminophenol-6-sulphonic acid | do | Olive. |
| 10 | 4-nitro-2-aminophenol-6-sulphonic acid | do | Greenish olive. |
| 11 | 2-amino-4-acetaminophenol-6-sulphonic acid | do | Reddish grey. |
| 12 | 2-aminophenol-4,6-disulphonic acid | do | Olive. |
| 13 | 1-amino-6-nitro-2-naphthol-4-sulphonic acid | do | Grey. |
| 14 | 2-aminophenol-4-sulphonic acid | 1-N-methyl-6-hydroxy-naphthostyrile | Olive. |
| 15 | 2-aminophenol-4-sulphonic acid amide | do | Do. |
| 16 | 6-chloro-2-aminophenol-4-sulphonic acid | do | Yellowish olive. |
| 17 | 5-nitro-2-aminophenol-4-sulphonic acid | do | Olive. |
| 18 | 6-nitro-2-aminophenol-4-sulphonic acid | do | Olive-green. |
| 19 | 2-aminophenol-5-sulphonic acid | do | Yellowish brown. |
| 20 | 2-aminophenol-5-sulphonic acid amide | do | Do. |
| 21 | 4-chloro-2-aminophenol-5-sulphonic acid | do | Olive. |
| 22 | 4-chloro-2-aminophenol-6-sulphonic acid | do | Do. |
| 23 | 4-nitro-2-aminophenol-6-sulphonic acid | do | Greenish olive. |
| 24 | 2-amino-4-acetaminophenol-6-sulphonic acid | do | Reddish grey. |
| 25 | 1-amino-6-nitro-2-naphthol-4-sulphonic acid | do | Grey. |
| 26 | 2-aminophenol-4-sulphonic acid | 1-N-ethyl-6-hydroxy-naphthostyrile | Olive. |
| 27 | 2-aminophenol-4-sulphonic acid amide | do | Do. |
| 28 | 6-chloro-2-aminophenol-4-sulphonic acid | do | Yellowish olive. |
| 29 | 5-nitro-2-aminophenol-4-sulphonic acid | do | Olive. |
| 30 | 6-nitro-2-aminophenol-4-sulphonic acid | do | Olive-green. |
| 31 | 2-aminophenol-5-sulphonic acid | do | Yellowish brown. |
| 32 | 2-aminophenol-5-sulphonic acid amide | do | Do. |
| 33 | 4-chloro-2-aminophenol-5-sulphonic acid | do | Olive. |
| 34 | 4-chloro-2-aminophenol-6-sulphonic acid | do | Do. |
| 35 | 4-nitro-2-aminophenol-6-sulphonic acid | do | Greenish olive. |
| 36 | 2-amino-4-acetaminophenol-6-sulphonic acid | do | Reddish grey. |
| 37 | 2-aminophenol-4,6-disulphonic acid | do | Olive. |
| 38 | 1-amino-6-nitro-2-naphthol-4-sulphonic acid | do | Grey. | then treated on the fibre with chromium-yielding agents.

Those new heavy metal complex dyestuffs which are hardly soluble to insoluble in water prove to be especially valuable. They yield dyeings of very good fastness to light and wet processing on synthetic superpolyamide and polyurethane fibres.

In the following examples which are given for the purpose of illustrating the invention, the parts are parts by weight. The temperatures are given in degrees centigrade.

Example 1

11.6 parts 2-aminophenol-4-sulphonic acid are dissolved in 80 parts water and 20 parts concentrated hydrochloric acid and the solution is diazotised at 0° with a solution of 4 parts sodium nitrite in 20 parts water. This mixture is added to a solution containing 10.8 parts 6-hydroxy-naphthostyrile, 2.4 parts sodium hydroxide and 10 parts sodium carbonate in 100 parts water. Stirring is continued at 5–20° for 10 hours, 50 parts sodium chloride are then gradually added, the dyestuff is filtered off with suction and dried at 90°.

The dyestuff so obtained corresponds to the formula

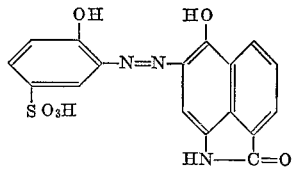

and dyes wool by the after-chroming method in olive shades of very good fastness to light and wet processing.

The following Table 1 gives further diazo and coupling components from which new dyestuffs are obtained in an Example 39

8.9 parts 4-chloro-2-aminophenol are dissolved in 50 parts water and 20 parts concentrated hydrochloric acid and the solution is diazotised at 0° with a solution of 4 parts sodium nitrite in 20 parts water. This mixture is added to a solution containing 12.4 parts 1-N-ethyl-6-hydroxynaphthostyrile, 2.4 parts sodium hydroxide and 10 parts sodium carbonate in 100 parts water, stirred at 5–10° for 5 hours, the dyestuff is filtered off with suction, washed with water and dried at 90°.

8.5 parts of the dyestuff thus prepared are heated in 100 parts formamide with 3.1 parts chromic chloride hexahydrate and 5.7 parts sodium acetate at 110° for 4 hours. This mixture is subsequently added to 500 parts of a 2.5% sodium chloride solution at 50°, allowed to cool down while stirring, the chromium complex is filtered off with suction, washed with water and dried at 90°.

The 2:1 chromium complex dyestuff so obtained corresponds to the formula

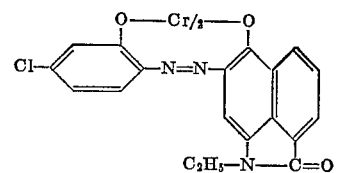

and dyes synthetic superpolyamide fibers in grey shades fast to light and washing.

With the diazo and coupling components listed in the following Table 2 there are obtained further dyestuffs which are converted into their 2:1 chromium complexes in a manner analogous to that described in Example 39. The chromium complexes dye synthetic superpolyamide fibres from a dispersion in the shades stated in the table.

TABLE 2

| Example Number | Diazo component | Coupling component | Shade on polyamide fibres |
| --- | --- | --- | --- |
| 40 | 2-aminophenol | 6-hydroxy-naphthostyrile | Black. |
| 41 | 4-chloro-2-aminophenol | do | Blue-black. |
| 42 | 4,6-dichloro-2-aminophenol | do | Black. |
| 43 | 4-nitro-2-aminophenol | do | Olive. |
| 44 | 5-nitro-2-aminophenol | do | Do. |
| 45 | 4-chloro-5-nitro-2-aminophenol | do | Do. |
| 46 | 4-chloro-6-nitro-2-aminophenol | do | Do. |
| 47 | 6-chloro-4-nitro-2-aminophenol | do | Olive-green. |
| 48 | 3-amino-4-hydroxytoluene | do | Olive. |
| 49 | 2-aminophenol-4-sulphonic acid dimethylamide | do | Do. |
| 50 | 2-aminophenol-5-sulphonic acid dimethylamide | do | Grey. |
| 51 | 3-amino-4-hydroxyphenyl-1-ethylsulphone | do | Black. |
| 52 | 3-amino-4-hydroxy-diphenyl sulphone | do | Do. |
| 53 | 2-aminophenol | 1-N-methyl-6-hydroxy-naphthostyrile | Grey. |
| 54 | 4-chloro-2-aminophenol | do | Do. |
| 55 | 4,6-dichloro-2-aminophenol | do | Black. |
| 56 | 4-nitro-2-aminophenol | do | Olive. |
| 57 | 5-nitro-2-aminophenol | do | Do. |
| 58 | 4-chloro-5-nitro-2-aminophenol | do | Do. |
| 59 | 4-chloro-6-nitro-2-aminophenol | do | Do. |
| 60 | 6-chloro-4-nitro-2-aminophenol | do | Olive-green. |
| 61 | 3-amino-4-hydroxy-toluene | do | Greenish olive. |
| 62 | 2-aminophenol-4-sulphonic acid dimethylamide | do | Currant blue. |
| 63 | 2-aminophenol-5-sulphonic acid dimethylamide | do | Grey. |
| 64 | 3-amino-4-hydroxyphenyl-1-ethylsulphone | do | Do. |
| 65 | 3-amino-4-hydroxy-diphenyl sulphone | do | Do. |
| 66 | 2-aminophenol | 1-N-ethyl-6-hydroxy-naphthostyrile | Do. |
| 67 | 4,6-dichloro-2-aminophenol | do | Do. |
| 68 | 4-nitro-2-aminophenol | do | Olive. |
| 69 | 5-nitro-2-aminophenol | do | Do. |
| 70 | 4-chloro-5-nitro-2-aminophenol | do | Do. |
| 71 | 4-chloro-6-nitro-2-aminophenol | do | Brown. |
| 72 | 6-chloro-4-nitro-2-aminophenol | do | Olive-green. |
| 73 | 3-amino-4-hydroxytoluene | do | Olive. |
| 74 | 2-aminophenol-4-sulphonic acid dimethylamide | do | Currant blue. |
| 75 | 2-aminophenol-5-sulphonic acid dimethylamide | do | Grey. |
| 76 | 3-amino-4-hydroxyphenyl-1-ethylsulphone | do | Do. |
| 77 | 3-amino-4-hydroxy-diphenylsulphone | do | Do. |

Example 78

11.7 parts 3-amino-4-hydroxyphenyl-1-ethyl-sulphone are dissolved in 100 parts water and 20 parts concentrated hydrochloric acid and the solution is diazotised at 0° with a solution of 4 parts sodium nitrite in 20 parts water. This mixture is allowed to run into a solution containing 10.8 parts 6-hydroxy-naphthostyrile, 2.4 parts sodium hydroxide and 10 parts sodium carbonate in 100 parts of water, the reaction mixture is stirred at 5–10° for 5 hours, the dyestuff is filtered off with suction, washed with water and dried at 90°.

11.3 grams of the dyestuff thus prepared are heated in 100 parts formamide with 4.0 parts crystalline cobalt sulphate and 10 parts sodium acetate at 90° for 4 hours, until the cobalting is completed. The reaction mixture is subsequently added to 500 parts of a 2.5% sodium chloride solution at 50°, allowed to cool down, the cobalt complex of the dyestuff is filtered off with suction, washed with water and dried at 90°.

The cobalt complex dyestuff so obtained dyes superpolyamide fibres in brown-violet shades of very good fastness to light and washing.

With the diazo and coupling components listed in the following Table 3 there are obtained further dyestuffs which are converted into their 2:1 cobalt complexes in a manner analogous to that described in Example 78. The cobalt complexes dye superpolyamide fibres from a dispersion in the shades stated in the table:

TABLE 3

| Example Number | Diazo component | Coupling component | Shade on polyamide fibres |
| --- | --- | --- | --- |
| 79 | 2-aminophenol | 6-hydroxy-naphthostyrile | Bordeaux. |
| 80 | 4-chloro-2-aminophenol | do | Currant. |
| 81 | 4,6-dichloro-2-aminophenol | do | Do. |
| 82 | 4-nitro-2-aminophenol | do | Red-violet. |
| 83 | 5-nitro-2-aminophenol | do | Olive. |
| 84 | 4-chloro-5-nitro-2-aminophenol | do | Olive-brown. |
| 85 | 4-chloro-6-nitro-2-aminophenol | do | Brownish olive. |
| 86 | 6-chloro-4-nitro-2-aminophenol | do | Olive. |
| 87 | 3-amino-4-hydroxytoluene | do | Yellowish olive. |
| 88 | 2-aminophenol-4-sulphonic acid dimethylamide | do | Brown-violet. |
| 89 | 3-amino-4-hydroxy-diphenylsulphone | do | Red-violet. |
| 90 | 2-aminophenol | 1-N-methyl-6-hydroxynaphthostyrile | Bordeaux. |
| 91 | 4-chloro-2-aminophenol | do | Currant. |
| 92 | 4,6-dichloro-2-aminophenol | do | Do. |
| 93 | 4-nitro-2-aminophenol | do | Dark brown. |
| 94 | 5-nitro-2-aminophenol | do | Greenish grey. |
| 95 | 4-chloro-5-nitro-2-aminophenol | do | Olive-brown. |
| 96 | 4-chloro-6-nitro-2-aminophenol | do | Brownish olive. |
| 97 | 6-chloro-4-nitro-2-aminophenol | do | Olive. |
| 98 | 3-amino-4-hydroxytoluene | do | Yellowish olive. |
| 99 | 2-aminophenol-4-sulphonic acid dimethylamide | do | Brown-violet. |
| 100 | 2-aminophenol-5-sulphonic acid dimethylamide | do | Reddish brown. |
| 101 | 3-amino-4-hydroxyphenyl-1-ethylsulphone | do | Red-violet brown. |
| 102 | 3-amino-4-hydroxydiphenylsulphone | do | Brown-violet. |
| 103 | 2-aminophenol | do | Bordeaux. |
| 104 | 4-chloro-2-aminophenol | do | Currant. |
| 105 | 4,6-dichloro-2-aminophenol | do | Do. |
| 106 | 4-nitro-2-aminophenol | do | Dark brown. |
| 107 | 5-nitro-2-aminophenol | do | Greenish grey. |
| 108 | 4-chloro-5-nitro-2-aminophenol | do | Olive-brown. |
| 109 | 4-chloro-6-nitro-2-aminophenol | do | Brownish olive. |
| 110 | 6-chloro-4-nitro-2-aminophenol | do | Olive. |
| 111 | 2-amino-4-hydroxytoluene | do | Yellowish olive. |
| 112 | 2-aminophenol-4-sulphonic acid dimethylamide | do | Brown-violet. |
| 113 | 2-aminophenol-5-sulphonic acid dimethylamide | do | Reddish brown. |
| 114 | 3-amino-4-hydroxyphenyl-1-ethylsulphone | do | Brown-violet. |
| 115 | 3-amino-4-hydroxydiphenylsulphone | do | Do. |

Example 116

9.8 parts 2-amino-5-nitro-anisole are dissolved in 100 parts water and 20 parts concentrated hydrochloric acid and the solution is diazotised at 0° with a solution of 4 parts sodium nitrite in 20 parts water. This mixture is added to a solution containing 12.4 parts 1-N-ethyl-6-hydroxy-naphthostyrile, 2.4 parts sodium hydroxide and 10 parts sodium carbonate in 100 parts water, the reaction mixture is stirred at 5–10° for 5 hours, the dyestuff is filtered off with suction, thoroughly washed with water and dried at 90°.

20 grams of the dyestuff so obtained are dissolved in 250 parts ethylene glycol, a solution of 13 g. crystalline copper sulphate in 125 parts of 10% aqueous ammonia is added, and this mixture is stirred at 100° for 8 hours. The mixture is allowed to cool down, poured into 1000 parts water, the copper complex formed is filtered off with suction and washed with a little water.

The dyestuff is decoppered, while still moist, by briefly heating it with 100 parts water and 100 parts concentrated hydrochloric acid, isolated by filtration after cooling, thoroughly washed with water and dried at 90°.

The dyestuff thus prepared is identical with the o,o'-dihydroxy-azo dyestuff which is the basis of Examples 69 and 107 and can be converted by the methods described in Examples 39 and 78 into the 2:1 chromium complex (Example 69) and 2:1 cobalt complex (Example 107), respectively.

Most of the o,o'-dihydroxy-azo dyestuffs mentioned in Examples 1 to 115 can be prepared in an analogous manner from the corresponding o-hydroxy-o'-methoxy-azo dyestuffs.

Example 117

5.7 parts 2-chloroaniline-5-sulphonic acid are dissolved in 50 parts water and 10 parts concentrated hydrochloric acid and the solution is diazotised at 0° with 2 parts sodium nitrite in 10 parts water. This mixture is added to a solution containing 5.4 parts 6-hydroxy-naphthostyrile, 1.2 parts sodium hydroxide and 5 parts sodium carbonate in 50 parts water. The reaction mixture is stirred at 5–15° for 6 hours, the dyestuff is precipitated by the addition of sodium chloride, filtered off with suction and dried at 90°.

10 parts of the dyestuff so obtained are dissolved hot in 400 parts water and 20 parts of a 35% sodium hydroxide solution and 20 parts of a 25% ammonia solution are added. A solution of 7 parts crystalline copper sulphate in 50 parts 25% ammonia are added at 80° within 15 minutes. The mixture is kept at 80° for 1 hour, the excess sodium hydroxide solution is buffered with hydrochloric acid, the mixture is allowed to cool down, the dyestuff is precipitated by the addition of sodium chloride and filtered off with suction.

By briefly boiling with 100 parts semi-concentrated hydrochloric acid, the copper complex is converted into the free o,o'-dihydroxy-azo dyestuff. The latter is identical with the dyestuff prepared according to Example 1 from 2-aminophenol-4-sulphonic acid and 6-hydroxy-naphthostyrile.

A substantial part of the o,o'-dihydroxy-azo dyestuffs mentioned in Examples 1–115 can be prepared in a similar manner from the corresponding o-hydroxy-o'-chloro-azo dyestuffs.

Example 118

3.8 parts 3-chloroaniline are dissolved in 50 parts water and 10 parts concentrated hydrochloric acid and the solution is diazotised at 0° with 2 parts sodium nitrite in 10 parts water. This mixture is added to a solution containing 6.2 parts 1-N-ethyl-6-hydroxy-naphthostyrile, 1.2 parts sodium hydroxide and 5 parts sodium carbonate in 50 parts water. The reaction mixture is stirred for 5 hours at 5–10°, the dyestuff is filtered off with suction, washed with water and dried at 90°.

9 parts of the monoazo dyestuff so obtained are dissolved in 100 parts ethylene glycol, and a solution is added, which contains 7.4 parts crystalline copper sulphate and 8 parts sodium acetate in 200 parts water. The mixture is heated to 60° and 11.4 parts of a 20% hydrogen peroxide solution are added dropwise within 60 minutes. The mixture is subsequently diluted with 600 parts water, the dyestuff is filtered off with suction and thoroughly washed with water.

The dyestuff is briefly boiled with 100 parts semi-concentrated hydrochloric acid, while still moist, filtered off with suction after cooling, washed and dried. The product is identical with the o,o'-dihydroxy-azo dyestuff obtained according to Example 2 from 4-chloro-2-aminophenol and 1-N-ethyl-6-hydroxy-naphthostyrile and can be converted into the 2:1 chromium and cobalt complexes.

A substantial part of the o,o'-dihydroxy-azo dyestuff mentioned in Examples 1–115 can be prepared in an analogous manner from the corresponding o-hydroxy-azo dyestuffs.

Example 119

5 parts 2-amino-benzthiazole are dissolved in 30 parts concentrated phosphoric acid and the solution is diazotised at −5° with 9 parts nitrosyl-sulphuric acid. The mixture is stirred at −5° for 2 hours and a solution of 7 parts 1-N-n-butyl-6-hydroxy-naphthostyrile in 40 parts glacial acetic acid is subsequently added dropwise below 0°. The mixture is stirred for 1 hour, then poured onto 200 parts ice, buffered with a sodium carbonate solution, the dyestuff is filtered off with suction and dried at 80°.

The dyestuff so obtained dyes nickel-modified polypropylene in bluish grey shades of good fastness properties.

Example 120

10 parts of the 2:1 chromium complex dyestuff according to Example 39 are ground with 10 parts of a naphthalene-formaldehyde condensation product and stirred into 10 litres water of pH 6. 10 parts of a levelling adjuvant, e.g. an alkyl-phenyl polyglycol ether, are subsequently added. 1000 parts of a fabric made from synthetic polyamide fibres is introduced into this dyebath and the temperature is slowly raised to 100°. After dyeing at this temperature for 1 hour, the material is rinsed, washed and dried. A grey dyeing of very good fastness to light and wet processing is obtained.

Example 121

10 parts of a dyestuff according to Example 1 are dissolved in 10 litres water at 40–45°, and 10 parts sodium sulphate and 5 parts 30% acetic acid are added. 1000 parts of a woollen fabric are introduced into this dyebath and the temperature is raised to boiling point. Dyeing is carried out at boiling temperature for one hour, 20 parts 50% sulphuric acid are added and boiling is continued for 30 to 45 minutes until the dyebath is exhausted. 100 parts of a 5% potassium dichromate solution are subsequently added to the dyebath which is again boiled for 45 minutes whereby the initially red shade turns olive. After rinsing, washing and drying, an olive dyeing of very good fastness to light and washing is obtained.

Example 122

14.2 parts of 2-aminophenol-4-sulphonamide are dissolved in 100 parts of water and 25 parts of concentrated hydrochloric acid and diazotised at 0° with a solution of 5 parts of sodium nitrite in 20 parts of water. The diazonium salt solution is added at 0° to a solution of 13.6 parts of 6-hydroxynaphthostyrile, 3 parts of sodium hydroxide and 20 parts of 25% aqueous ammonia solution in 200 parts of water. The mixture is stirred at 5 to 20° for about 5 hours and subsequently 60 parts of sodium chloride added and the dyestuff filtered with suction. The filter residue is slurried in water, rendered acidic by means of hydrochloric acid at 60 to 80°, again filtered with suction, thoroughly washed with water and finally dried at 80 to 90°.

14 parts of the dyestuff thus obtained are heated at 110° in 100 parts of formamide with 3.9 parts of chromium-(III)-chloride-hexahydrate and 8 parts of sodium acetate for 4 hours. The resulting mixture is then poured into 500 parts of a 5% sodium chloride solution at 80°, stirred at this temperature for another hour and the chromium complex dyestuff filtered with suction, washed with sodium chloride solution and dried at 90°. The dyestuff thus obtained is the 1:2-chromium complex dyestuff of the formula

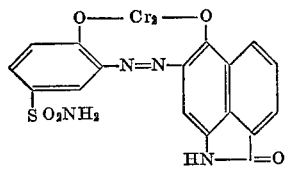

it dyes wool dark brown shades fast to light and to washing.

If using in this example the diazo and coupling components which are listed in the following table monoazo dyestuffs are obtainable which are transformed into the 1:2-chromium complex compounds by the method given in this example. The chromium complex dyestuffs dye wool in the shades given in the following table:

The o,o'-dihydroxy azo dyestuffs which can be obtained from the diazo and coupling components listed in Table 5 can be transformed into their cobalt complex compounds in analogous manner. They dye wool in the shades listed below:

TABLE 5

| Example Number | Diazo component | Coupling component | Shade on wool |
| --- | --- | --- | --- |
| 135 | 2-aminophenol-4-N-methylsulphonamide | 6-hydroxy-naphthostyrile | Reddish brown. |
| 136 | 2-aminophenol-5-sulphonamide | do | Grey-brown. |
| 137 | 2-aminophenol-5-N-methylsulphonamide | do | Do. |
| 138 | 2-aminophenol-4-sulphonamide | 1-N-methyl-6-hydroxy-naphthostyrile | Reddish brown. |
| 139 | 2-aminophenol-4-N-methylsulphonamide | do | Do. |
| 140 | 2-aminophenol-5-sulphonamide | do | Grey-brown. |
| 141 | 2-aminophenol-5-N-methylsulphonamide | do | Do. |
| 142 | 2-aminophenol-4-sulphonamide | 1-N-ethyl-6-hydroxy-naphthostyrile | Reddish brown. |
| 143 | 2-aminophenol-4-N-methylsulphonamide | do | Do. |
| 144 | 2-aminophenol-5-sulphonamide | do | Grey-brown. |
| 145 | 2-aminophenol-5-N-methylsulphonamide | do | Do. |

Example 146

4.95 parts of the o,o'-dihydroxy azo dyestuff obtained from 4-chloro-2-aminophenol and 6-hydroxy-naphthostyrile in accordance with Example 39 are heated at 160° in 100 parts of ethylene glykol together with 4 parts of chromium-(III)-chloride-hexahydrate for 4 hours. After cooling to 110° 4.4 parts of the dyestuff of the formula

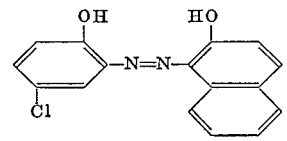

8 parts of sodium acetate and 50 parts of formamide are

TABLE 4

| Example Number | Diazo component | Coupling component | Shade on wool |
| --- | --- | --- | --- |
| 123 | 2-aminophenol-4-N-methylsulpphonamide | 6-hydroxy-napthostyrile | Black-brown. |
| 124 | 2-aminophenol-5-sulphonamide | do | Olivish grey. |
| 125 | 2-aminophenol-5-N-methylsulphonamide | do | Do. |
| 126 | 2-aminophenol-4-sulphonamide | 1-N-methyl-6-hydroxy-naphthostyrile | Black-brown. |
| 127 | 2-aminophenol-4-N-methylsulphonamide | do | Do. |
| 128 | 2-aminophenol-5-sulphonamide | do | Grey-olive. |
| 129 | 2-aminophenol-5-N-methylsulphonamide | do | Do. |
| 130 | 2-aminophenol-4-sulphonamide | 1-N-ethyl-6-hydroxy-naphthostyrile | Black-brown. |
| 131 | 2-aminophenol-4-N-methylsulphonamide | do | Do. |
| 132 | 2-aminophenol-5-sulphonamide | do | Grey-olive. |
| 133 | 2-aminophenol-5-N-methylsulphonamide | do | Do. |

Example 134

14 parts of the o,o'-dihydroxy azo dyestuff obtained from diazotised 2-aminophenol-4-sulphonamide and 6-hydroxynaphthostyrile in accordance with the method given in Example 122 are heated to 90° in 100 parts of formamide together with 4.1 parts of crystalline cobalt sulphate and 5 parts of sodium acetate for 4 hours. The mixture is then stirred into 500 parts of 10% sodium chloride solution at 80°, kept at this temperature for one hour and then filtered with suction, washed with sodium chloride solution and dried at 90°.

The 1:2-cobalt complex dyestuff thus obtained dyes wool reddish brown shades of good fastness to light and washing.

added and the mixture stirred for 2 hours at 110°. Then it is added to a solution of 500 parts of 2% sodium chloride at 80°, stirred at this temperature for one hour, filtered with suction, thoroughly washed with water and dried at 80°.

The mixed chromium complex obtained yields on polyamide fibres a black-currant dyeing of very good fastness to light and washing.

Most of the dyestuffs named in Tables 1, 2 and 4 can be transformed into the mixed chromium complexes when metal-complexed an analogous manner in the presence of a second o,o'-dihydroxy azo dyestuff. Table 6 shows the dye-shades of some mixed complex dyestuffs in polyamide fibres. Table 7 shows the shades of some dyestuffs on wool.

TABLE 6

| Example Number | 1. Component | 2. Component | Shade on polyamide fibre |
|---|---|---|---|
| 147 | [structure: 4-chlorophenyl-OH with N=N to hydroxynaphthalene carboxamide] | [structure: nitro-chloro-hydroxyphenyl-N=N-hydroxyphenyl-N(C$_2$H$_5$)$_2$] | Navy blue. |
| 148 | Same as Ex. No. 147 above. | [structure: nitro-hydroxyphenyl-N=N-hydroxynaphthalene] | Brownish black. |
| 149 | Same as Ex. No. 147 above. | [structure: SO$_2$C$_2$H$_5$-hydroxyphenyl-N=N-hydroxynaphthalene] | Black currant. |
| 150 | Same as Ex. No. 147 above. | [structure: O$_2$N-hydroxyphenyl-N=N-hydroxynaphthalene] | Greenish black. |
| 151 | Same as Ex. No. 147 above. | [structure: dichloro-hydroxyphenyl-N=N-hydroxynaphthalene] | Blue-grey. |
| 152 | Same as Ex. No. 147 above. | [structure: O$_2$N-chloro-hydroxyphenyl-N=N-hydroxynaphthalene] | Do. |
| 153 | Same as Ex. No. 147 above. | [structure: nitro-hydroxyphenyl-N=N-hydroxyphenyl-NH-phenyl] | Currant. |
| 154 | Same as Ex. No. 147 above. | [structure: O$_2$N-hydroxyphenyl-N=N-pyrazoloquinazolinone] | Do. |
| 155 | Same as Ex. No. 147 above. | [structure: chloro-hydroxyphenyl-N=N-(1-phenyl-3-methyl-5-hydroxypyrazole)] | Red violetbrown. |

TABLE 6—Continued

| Example Number | 1. Component | 2. Component | Shade on polyamide fibre |
|---|---|---|---|
| 156 | Same as Ex. No. 147 above. | 2-hydroxy-4-nitrophenyl azo coupled to 3-methyl-5-hydroxy-1-phenylpyrazole | Dark brown. |
| 157 | 2-hydroxy-5-nitrophenyl azo 1-hydroxy-...-naphthamide derivative | 2-hydroxy-3-nitro-5-chlorophenyl azo 2-hydroxy-5-(N,N-diethylamino)phenyl | Blue-black. |
| 158 | Same as Ex. No. 157 above. | 2-hydroxy-5-chlorophenyl azo 1-hydroxynaphthalene | Grey. |
| 159 | Same as Ex. No. 157 above. | 2-hydroxy-5-nitrophenyl azo 1-hydroxynaphthalene | Black-olive. |
| 160 | Same as Ex. No. 157 above. | 2-hydroxy-5-chlorophenyl azo 3-methyl-5-hydroxy-1-phenylpyrazole | Dark-brown. |
| 161 | Same as Ex. No. 157 above. | 2-hydroxy-5-nitrophenyl azo 3-methyl-5-hydroxy-1-phenylpyrazole | Do. |
| 162 | 2-hydroxy-5-nitrophenyl azo 1-hydroxy-4-(N-ethylamino)-naphthamide | 2-hydroxy-5-nitrophenyl azo 1-hydroxynaphthalene | Olive black. |
| 163 | Same as Ex. No. 162 above. | 2-hydroxy-5-chlorophenyl azo 1-hydroxynaphthalene | Black. |

TABLE 6—Continued

| Example Number | 1. Component | 2. Component | Shade on polyamide fibre |
|---|---|---|---|
| 164 | Same as Ex. No. 162 above. | 4-chloro-2-hydroxyphenyl-azo-(3-methyl-5-hydroxy-1-phenyl-pyrazole) | Red-brown. |
| 165 | Same as Ex. No. 162 above. | 4-nitro-2-hydroxyphenyl-azo-(3-methyl-5-hydroxy-1-phenyl-pyrazole) | Do. |
| 166 | 2-hydroxyphenyl-azo-(1-hydroxy-3-dimethylsulfamoyl)-coupled to hydroxynaphthamide | 4-chloro-2-hydroxyphenyl-azo-1-hydroxynaphthalene | Black-currant. |
| 167 | Same as Ex. No. 166 above. | 4-nitro-2-hydroxyphenyl-azo-1-hydroxynaphthalene | Brownish black. |
| 168 | Same as Ex. No. 166 above. | 4-chloro-2-hydroxyphenyl-azo-(3-methyl-5-hydroxy-1-phenyl-pyrazole) | Brown. |
| 169 | Same as Ex. No. 166 above. | 4-nitro-2-hydroxyphenyl-azo-(3-methyl-5-hydroxy-1-phenyl-pyrazole) | Do. |

TABLE 7

| Example Number | 1. Component | 2. Component | Shade on wool |
|---|---|---|---|
| 170 | 4-chloro-2-hydroxyphenyl-azo-hydroxynaphthamide | 4-sulfamoyl-2-hydroxyphenyl-azo-1-hydroxynaphthalene | Grey. |

TABLE 7—Continued

| Example Number | 1. Component | 2. Component | Shade on wool |
|---|---|---|---|
| 171 | Same as Ex. No. 170 above. | ![structure with OH, SO2NH2, N=N, CH3, pyrazole-phenyl, HO] | Brown. |
| 172 | ![OH, NO2 phenyl-N=N-naphthyl with HO, HN—=O] | ![OH, SO2NH2 phenyl-N=N-naphthyl with HO] | Brownish grey. |
| 173 | Same as Ex. No. 172 above. | ![OH, SO2NH2 phenyl-N=N-pyrazole with CH3, HO, phenyl] | Dark brown. |
| 174 | ![OH, SO2NH2 phenyl-N=N-naphthyl with HO, HN—=O] | ![OH, SO2NH2 phenyl-N=N-pyrazole with CH3, HO, phenyl] | Brown. |
| 175 | Same as Ex. No. 174 above. | ![OH, SO2NH2 phenyl-N=N-naphthyl with HO] | Black. |

We claim:

1. A metal dyestuff complex of 1 mole of a metal selected from the group consisting of chromium, cobalt, copper, iron, and nickel; and 2 moles of compounds having the formula

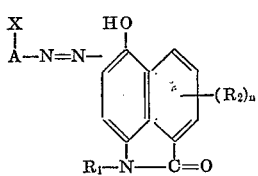

wherein A is selected from the group consisting of phenylene; phenylene substituted with chloro, nitro, acetylamino, sulfonic acid, sulfonamide, alkyl sulfonamide having 1 to 2 carbon atoms in the alkyl group, hydroxyethyl sulfonamide, sulfonic acid morpholide, alkyl having 1 to 2 carbon atoms, carboxyl, alkyl, sulfonyl having 1 to 2 carbon atoms, phenyl sulfonyl or —OCH$_2$SO$_2$—; naphthylene, naphthylene substituted with nitro, carboxyl, or sulfonic acid; benzothiazole; and alkoxy benzothiazole having 1 to 2 carbon atoms in the alkoxy group; X is a substituent in the position adjacent to the azo bridge in the A-radical, and is a metal-complex forming group or a substituent convertible into a metal complex by metallization in the presence of an oxidizing agent and is selected from the group consisting of hydroxyl, carboxyl, methoxy, sulfo, and hydrogen; R$_1$ is hydrogen, an alkyl group having 1 to 6 carbon atoms, a β-hydroxyethyl group, a β-chloroethyl group, a β-cyanoethyl group, a β-acetoxyethyl group, a β-carbethoxy group, or a β-carboxyethyl group; R$_2$ is hydrogen, chlorine, alkyl having 1 to 5 carbon atoms, alkoxy having 1 to 5 carbon atoms in the alkyl radical, acetylamino, sulfonylamino, nitro, sulfonic acid, carboxylic acid, or sulphonamide; and $n$ is the integer 1 or 2.

2. A dyestuff of claim 1 corresponding to the formula

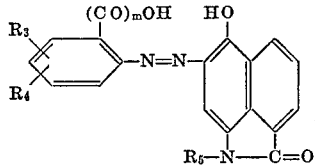

wherein $m$ stands for the number 0 or 1, R$_3$ stands for hydrogen, chlorine, bromine, nitro or sulfonamide, R$_4$ stands for hydrogen, chlorine or sulfonic acid group, R$_5$ stands for hydrogen, methyl or ethyl; and the chromium or cobalt complex compounds of said dyestuff.

3. A dyestuff of claim 1 corresponding to the formula

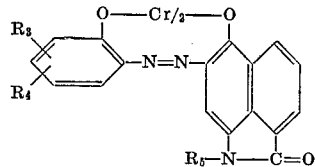

wherein $R_3$ stands for hydrogen, chlorine, bromine, nitro or sulfonamide, $R_4$ stands for hydrogen, chlorine or sulfonic acid group, and $R_5$ stands for hydrogen, methyl or ethyl.

4. A dyestuff of claim 1 corresponding to the formula

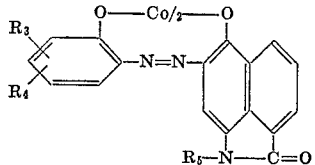

wherein $R_3$ stands for hydrogen, chlorine, bromine, nitro or sulfonamide, $R_4$ stands for hydrogen, chlorine or sulfonic acid group, and $R_5$ stands for hydrogen, methyl or ethyl.

5. The 1:2 molar complex of chromium and the dyestuff of claim 1 corresponding to the formula

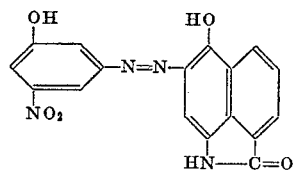

6. The 1:2 molar complex of chromium and the dyestuff of claim 1 corresponding to the formula

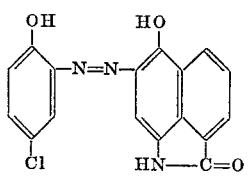

7. The 1:2 molar complex of chromium and the dyestuff of claim 1 corresponding to the formula

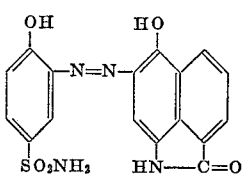

8. The 1:2 molar complex of cobalt and the dyestuff of claim 1 corresponding to the formula

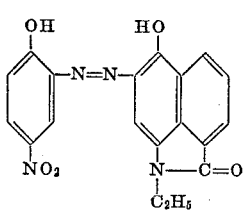

9. The 1:2 molar complex of chromium and the dyestuff of claim 1 corresponding to the formula

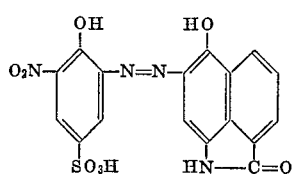

10. The 1:2 molar complex of chromium and the dyestuff of claim 1 corresponding to the formula

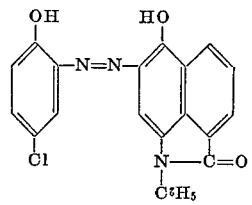

11. The 1:2 molar complex of chromium of the dyestuff of claim 1 corresponding to the formula

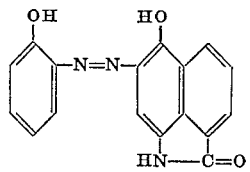

12. The 1:2 molar complex of chromium of the dyestuff of claim 1 corresponding to the formula

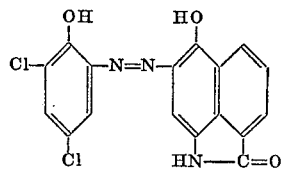

13. The 1:2 molar complex of chromium of the dyestuff of claim 1 corresponding to the formula

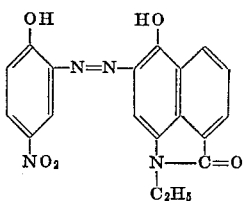

14. The 1:2 molar complex of chromium and the dyestuff of claim 1 corresponding to the formula

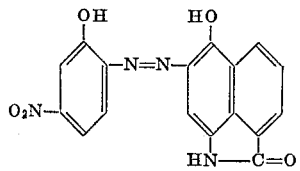

15. A metal dyestuff complex of 1 mole of a metal selected from the group consisting of chromium, cobalt, copper, iron, and nickel; and 2 moles of dyestuffs having the formula

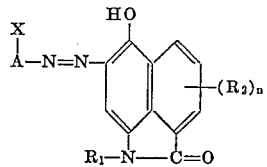

the second of said dyestuffs being a monoazo dyestuff having a metal complex forming group X is the o and o' positions to the azo groups; wherein A is selected from the group consisting of phenylene; phenylene substituted with chloro, nitro, acetylamino, sulfonic acid, sulfonamide, alkyl sulfonamide having 1 to 2 carbon atoms in the alkyl group; hydroxyethyl sulfonamide, sulfonic acid morpholide, alkyl having 1 to 2 carbon atoms, carboxyl, alkyl sulfonyl having 1 to 2 carbon atoms, phenyl sulfonyl or —OCH$_2$SO$_2$—; naphthylene; naphthylene substituted with nitro, carboxyl, or sulfonic acid; benzothiazole; and alkoxy benzothiazole having 1 to 2 carbon atoms in the alkoxy group; X is a substituent in the position adjacent to the azo bridge in the A-radical, and is a metal-complex forming group or a substituent convertible into a metal complex by metallization in the presence of an oxidizing agent and is selected from the group consisting of hydroxyl, carboxyl, methoxy, sulfo, and hydrogen; $R_1$ is hydrogen, an alkyl group having 0 to 6 carbon atoms, a β-hydroxyethyl group, a β-chloroethyl group, a β-cyanoethyl group, a β-acetoxyethyl group, a β-carbethoxyethyl group, or a β-carboxyethyl group; $R_2$ is hydrogen, chlorine, alkyl having 1 to 5 carbon atoms, alkoxy having 1 to 5 carbon atoms in the alkyl radical, acetylamino, sulfonylamino, nitro, sulfonic acid, carboxylic acid, or sulphonamide; and $n$ is the integer 1 or 2.

References Cited

UNITED STATES PATENTS

| | | | |
|---|---|---|---|
| 2,014,484 | 9/1935 | Stusser et al. | 260—146 |
| 2,025,991 | 12/1935 | Kunz et al. | 260—146 |
| 2,108,879 | 2/1938 | Zerweck et al. | 260—326.5 |
| 2,754,293 | 7/1956 | Brody et al. | 260—152 XR |
| 2,804,455 | 8/1957 | Dorlars et al. | 260—146 |
| 2,829,138 | 4/1958 | Kuster | 260—146 |
| 2,883,374 | 4/1959 | Enders et al. | 260—146 |
| 2,961,438 | 11/1960 | Fuchs et al. | 260—152 |
| 3,123,433 | 3/1964 | Du Peloux et al. | 260—152 XR |
| 3,331,831 | 7/1967 | Roue et al. | 260—146 XR |

FOREIGN PATENTS

| | | |
|---|---|---|
| 822,096 | 10/1959 | Great Britain. |
| 6,404,414 | 10/1964 | Netherlands. |
| 129,768 | 7/1960 | U.S.S.R. |

FLOYD D. HIGEL, Primary Examiner

U.S. Cl. X.R.

8—4, 42, 43; 117—138.8; 260—145, 147, 152, 157, 325